(12) United States Patent
Parra

(10) Patent No.: US 6,589,490 B1
(45) Date of Patent: Jul. 8, 2003

(54) UV WATER TREATMENT APPARATUS

(76) Inventor: Jorge M. Parra, 10721 Skyhawk Dr., New Port Richey, FL (US) 34654

( * ) Notice: Subject to any disclaimer, the term of this patent is extended or adjusted under 35 U.S.C. 154(b) by 0 days.

(21) Appl. No.: 09/982,983

(22) Filed: Oct. 22, 2001

Related U.S. Application Data

(60) Provisional application No. 60/241,792, filed on Oct. 20, 2000.

(51) Int. Cl.$^7$ .................................................. B01J 19/12
(52) U.S. Cl. ....................... 422/186.3; 422/24; 422/186; 210/748
(58) Field of Search ............................... 422/24, 186.3, 422/186; 210/748

(56) References Cited

U.S. PATENT DOCUMENTS

| | | | | |
|---|---|---|---|---|
| 3,818,914 A | * | 6/1974 | Bender | ........................ 607/90 |
| 5,043,627 A | * | 8/1991 | Fox | .............................. 313/491 |
| 5,387,400 A | * | 2/1995 | Pelster | ................... 422/186.03 |
| 5,853,676 A | * | 12/1998 | Morgan, Jr. | .............. 422/186.3 |
| 6,144,175 A | | 11/2000 | Parra | ........................... 315/307 |
| 6,265,835 B1 | | 7/2001 | Parra | ........................... 315/246 |
| 6,300,722 B1 | | 10/2001 | Parra | ....................... 315/209 R |
| 6,316,286 B1 | * | 11/2001 | Trezza | ........................ 438/107 |

FOREIGN PATENT DOCUMENTS

| | | | | |
|---|---|---|---|---|
| DE | 4119725 A1 | * | 1/1993 | ............. C02F/1/32 |
| JP | 05092185 A | * | 4/1993 | ............. C02F/1/32 |
| JP | 10085734 A | * | 4/1998 | ............. C02F/1/32 |

* cited by examiner

Primary Examiner—Nam Nguyen
Assistant Examiner—Brian L Mutschler
(74) Attorney, Agent, or Firm—Jim Zegeer

(57) ABSTRACT

Ultraviolet water treatment apparatus in which floating pods or rafts carry high-frequency driver circuits in waterproof plastic blocks. The high-frequency driver circuits drive arrays of ultraviolet lamps in a ballast-free, non-thermionic manner.

12 Claims, 5 Drawing Sheets

UV WATER TREATMENT APPARATUS

REFERENCE TO RELATED APPLICATIONS

The present application is the subject of provisional application Serial No. 60/241,792 filed Oct. 20, 2000 and entitled WATER TREATMENT APPARATUS.

BACKGROUND AND BRIEF DESCRIPTION OF THE INVENTION

This invention relates to UV water treatment apparatus to treat water, waste water, pools of water, etc.

This system incorporates the "Ballast-free UV Technology" disclosed in my U.S. Pat. Nos. 6,144,175 and 6,265,835, thereby eliminating the need for sleeves, ballast cooling and grounding systems, anti-fouling devices, etc.

"Pods" or rafts containing UV Lamps (G-36 or G-64, etc.) are floating stationary, by anchors on the walls of the "channel". The UV radiation passes to the water via windows at the bottom of the "pod," the windows being one to three inches above the water surface supported by pontoons on the UV raft or pod. A UV reflective cover inside the UV pod maximizes the UV flow to the water.

The system is unique and it is only possible due to the non-thermionic, ballast-free technology disclosed in the above patents. Preferably, the pods or rafts are supplied with 12 volt or another suitable low voltage to eliminate "shock hazards."

Present installations of this capacity must depend on the use of Polychromatic Medium Pressure UV Lamps. The non-thermionic, ballast-free system can use low pressure lamps resulting in higher output with less energy usage.

An object of the invention is to provide a UV water treatment apparatus and system. One or more UV pods or rafts float on water in a treatment zone. Each UV pod having float members mounted on a rigid frame assembly and a plurality of UV lamps are mounted on the frame in an array. A set of high-frequency AC driver circuits are mounted on the frame and connected to drive the plurality of UV lamps, and a low-voltage DC supply is connected to the set of high-frequency AC drivers. Further features include: A UV reflector mounted on the frame above the UV lamps, a UV transmissive cover mounted on the frame below the UV lamps. Each said high-frequency AC driver is encased in a waterproof plastic mass (epoxy).

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1A:
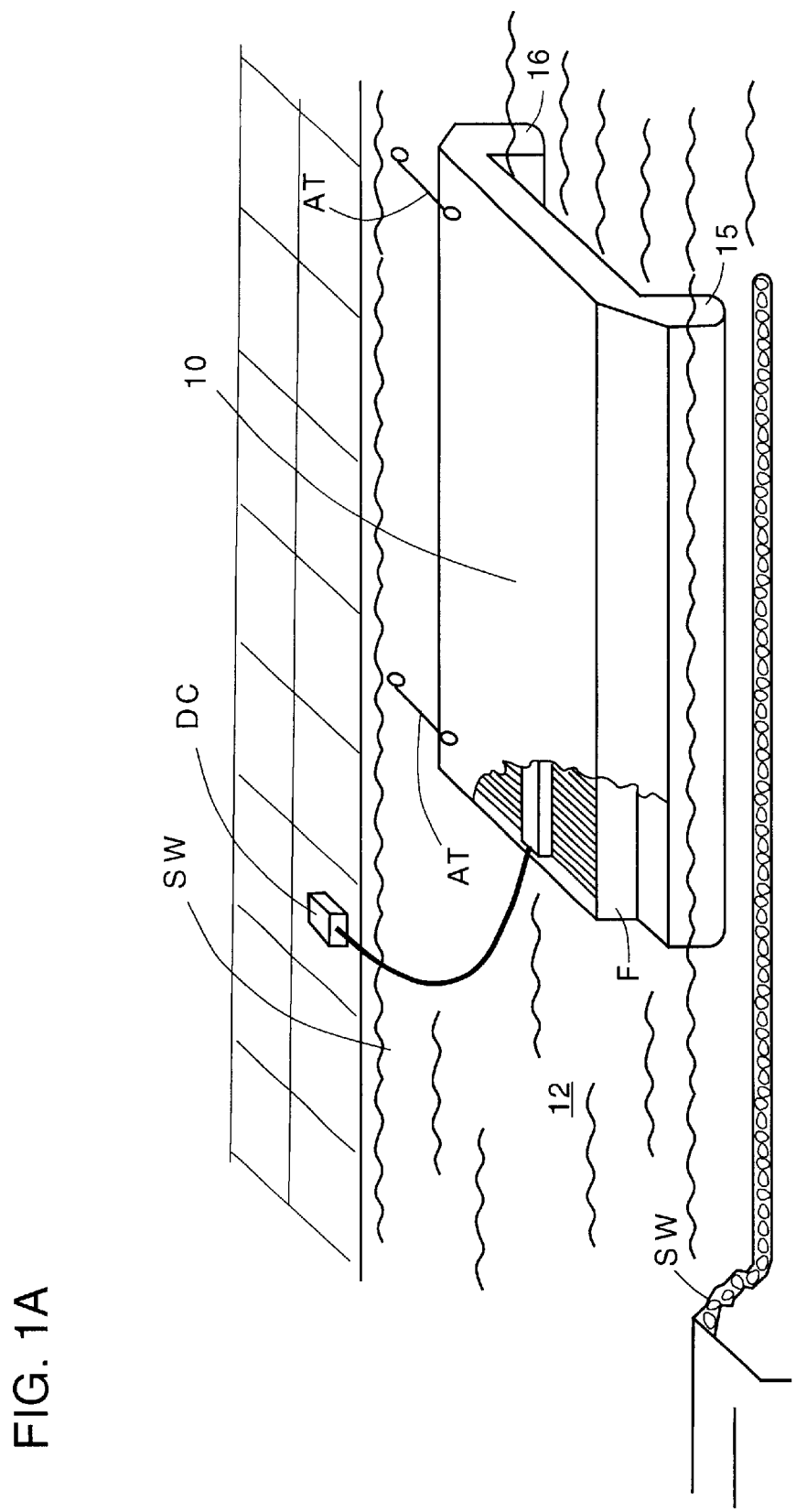
FIG. 1A is an isometric area of a UV treatment system incorporating the invention.
Figure 1C:
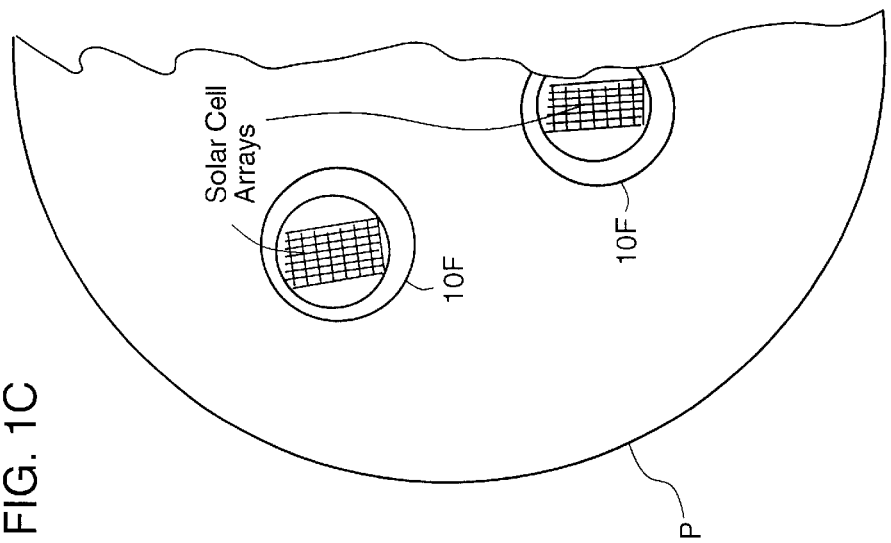
FIG. 1C is an isometric view of a further modification.
Figure 1B:
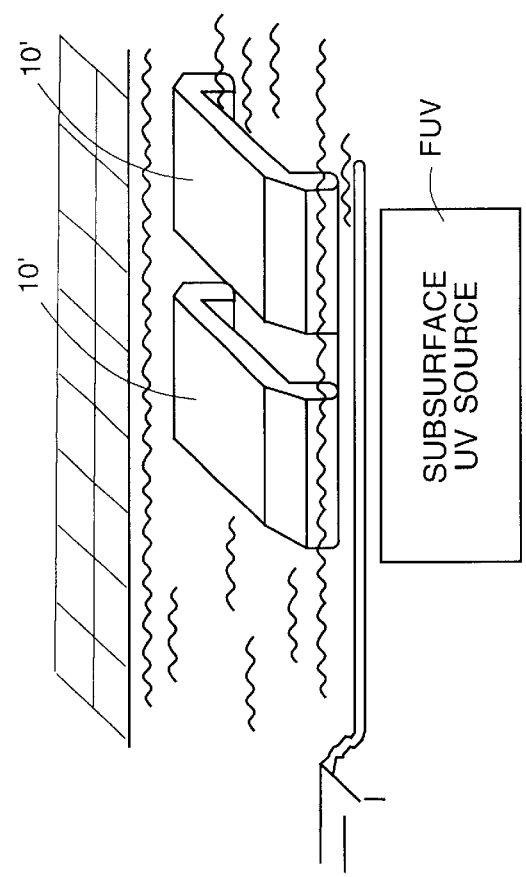
FIG. 1B is an isometric view of a modification.

FIGS. 1A, 1B and 1C illustrate UV water treatment apparatus wherein a pontoon or float system supporting one or more arrays of ultraviolet (UV) lamps driven by ballast-free, non-thermionic, high-frequency driver circuits of the type disclosed in my U.S. Pat. Nos. 6,144,175 and 6,265,835 (incorporated herein by reference). The floating UV raft/pod or float 10 shown in FIG. 1 is anchored or tethered AT to the sidewalls SW of a channel 12 of flowing water to be treated with UV radiation. A direct current voltage from a supply or source (DC) is supplied to the pods. A plurality of UV floats 10', 10" are anchored or tethered in one or more channels of water to be treated with fixed UV lamp arrays FUV in the sidewalls of the channel(s). A direct current voltage from a supply or source (DC) is supplied to the pods. Free-floating solar powered UV rafts 10F are shown on a pond or pool P in FIG. 1C.

Figure 2:
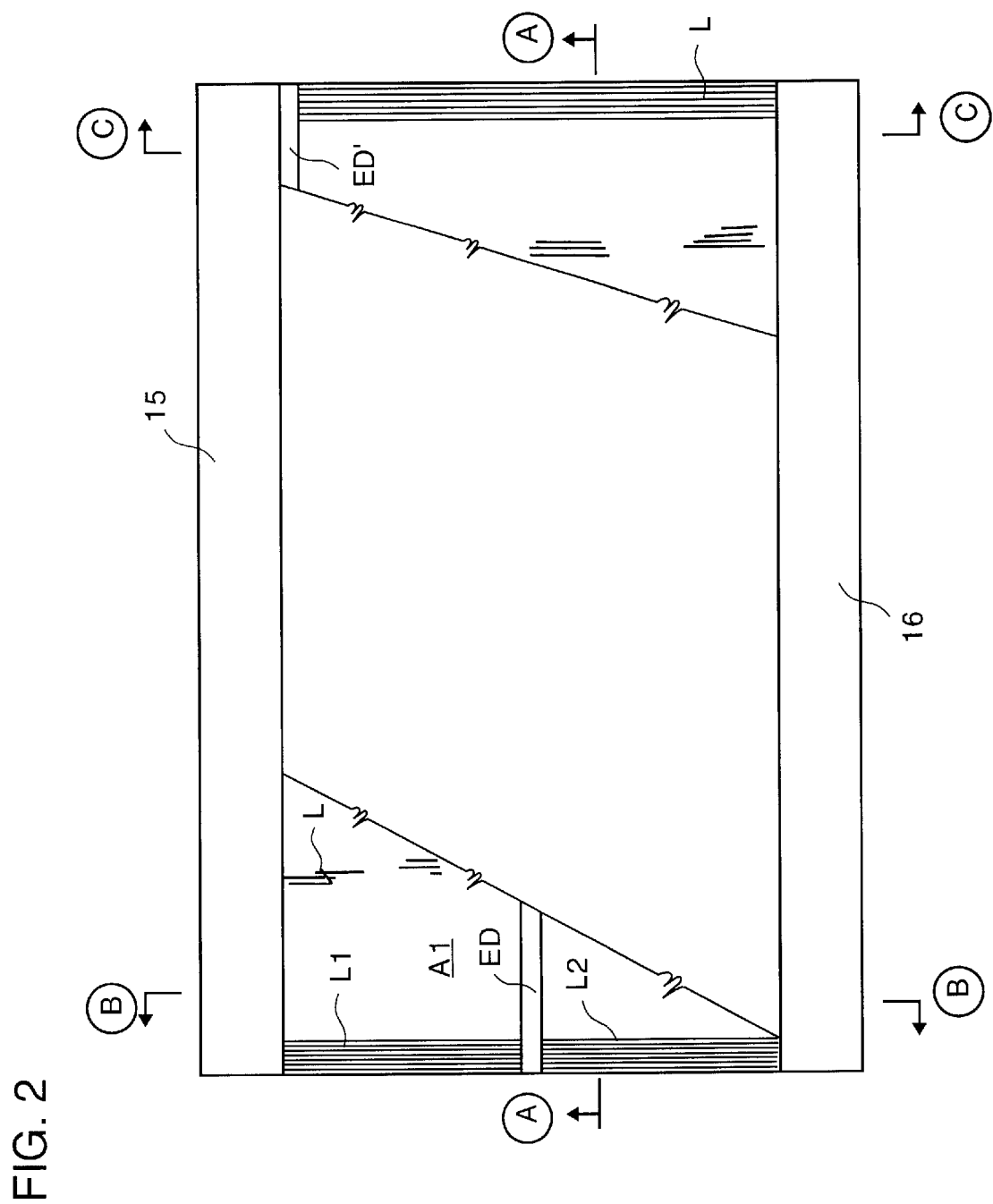
FIG. 2 is a top plan view of the two embodiments of the unit shown in FIG. 1A.
Figure 3:
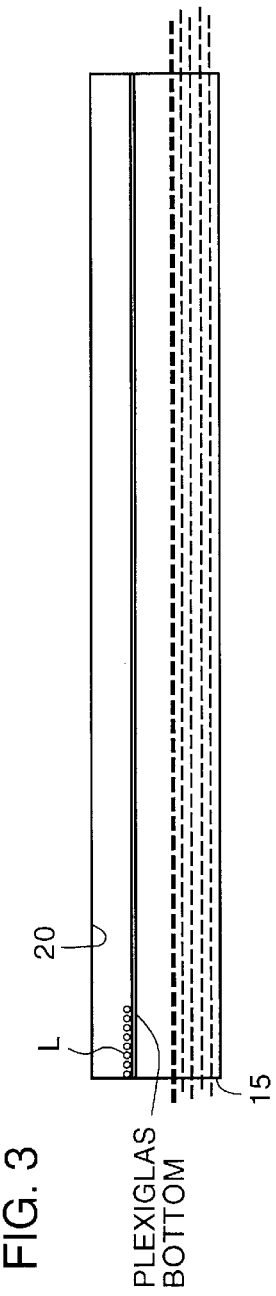
FIG. 3 is a sectional view on lines A—A of FIG. 2.
Figure 4:
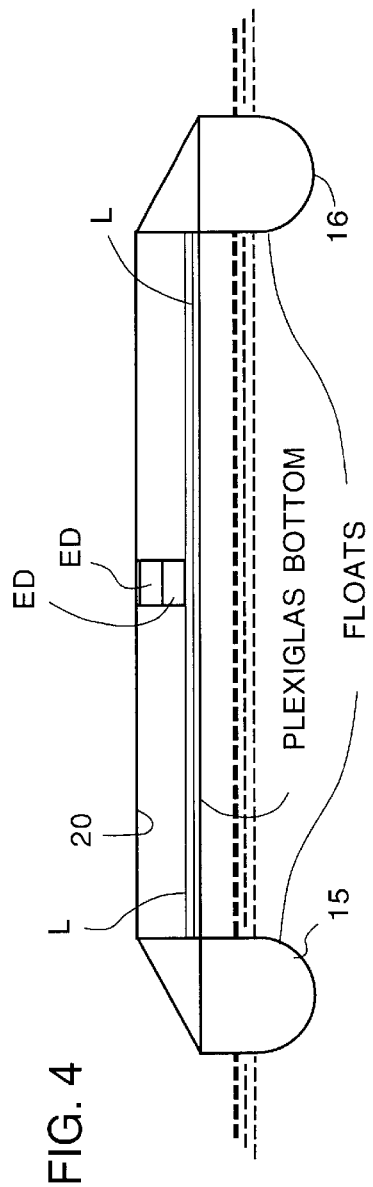
FIG. 4 is a sectional view on lines B—B of FIG. 2.

Referring to FIG. 2, a UV raft 10 is comprised of a pair of floats or pontoons 15, 16 mounted on a frame F (FIG. 1), the size of the pontoons 15, 16 is determined by the total weight of the UV raft 10, which is tethered or anchored to channels sidewalls SW. An array of UV lamps A1 shown in the left hand side of FIG. 2 is comprised to two rows L1, L2 of UV lamps (G-36) with a large number of lamps (288 in this example) driven by a center mounted row of high-frequency electronic drivers ED, shown stacked two high in FIG. 6. The electronic drivers ED are connected to a direct current (DC) voltage, preferably a low DC voltage to avoid the shock hazard. A UV reflector 20 maximizes the transfer of UV energy to the water. A UV transmissive bottom cover window is mounted below the UV lamps. The driver circuits ED are encased in an epoxy or moisture impervious plastic.

Figure 5:
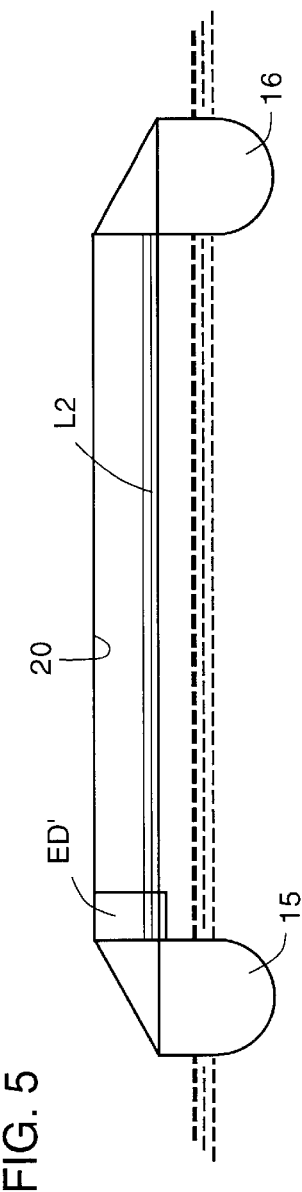
FIG. 5 is a sectional view on lines C—C of FIG. 2.
Figure 6:
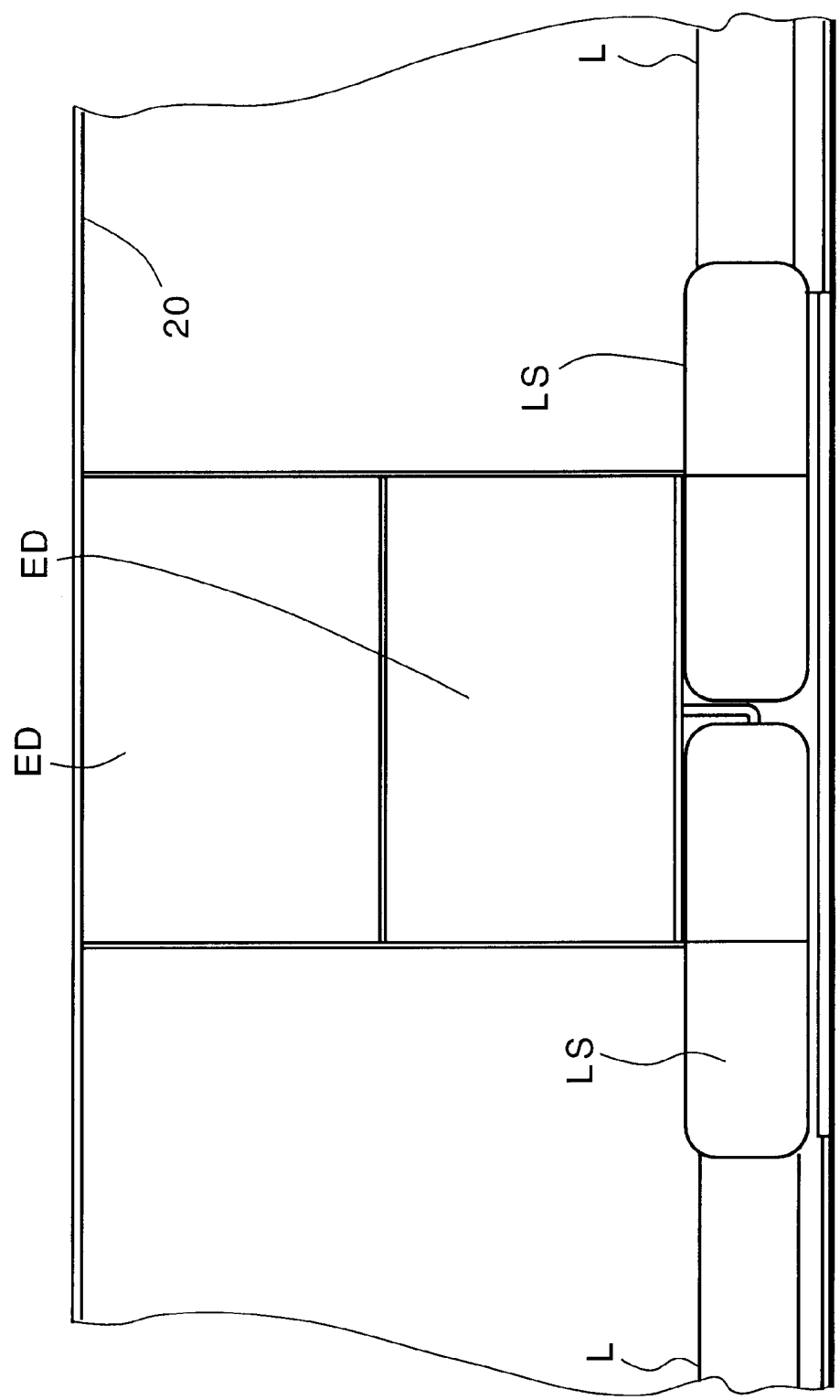
FIG. 6 is a detailed view of the internal architecture

As shown in FIG. 6, lamp sockets LS are connected to the electronic drivers ED and the UV lamps L are mounted in the sockets. In a preferred embodiment, two or more lamps L are connected in electrical series across a driver circuit ED. Since the ballast-free, high-frequency driver systems of U.S. Pat. Nos. 6,144,175 and 6,265,835 are non-thermionic, the filaments are not heated. In the right side of FIG. 2, a different architecture for the UV lamp array is disclosed: longer G-64 UV lamps (144 lamps in this example) driven by a row of ballast-free, non-thermionic, high-frequency driver circuits ED' which are mounted at one end of the frame (See FIG. 5).

While the invention has been described in relation to preferred embodiments of the invention, it will be appreciated that other embodiments, adaptations and modifications of the invention will be apparent to those skilled in the art.

What is claimed is:

1. A UV water treatment system comprising:
   one or more channels for flowing water to be treated through a treatment zone,
   one or more UV pods floating on said flowing water in said treatment zone, each UV pod having:
   a pair of spaced float members, a frame assembly mounted between said pair of float members,
   a plurality of UV lamps mounted above said flowing water on said frame assembly, and in an array,
   a set of high-frequency AC driver circuits mounted on said frame and connected to drive said plurality of UV lamps, and
   a low-voltage DC supply connected to said set of high-frequency AC driver circuits.

2. The water treatment system defined in claim 1 including a UV reflector mounted on said frame above said UV lamps.

3. The water treatment system defined in claim 1 including a UV transmissive cover mounted on said frame below said UV lamps.

4. The water treatment system defined in claim 1 wherein each of said high-frequency AC driver circuits is encased in a waterproof plastic mass.

5. The water treatment system defined in claim 2 including a UV transmissive cover mounted on said frame below said UV lamps.

6. The water treatment system defined in claim 5 wherein each of said high-frequency AC driver circuits is encased in a waterproof plastic mass.

7. A UV water treatment apparatus, comprising at least one float member, a frame assembly mounted on said at least one float member, a plurality of UV lamps mounted on said frame assembly in an array and above the water,
- a set of high-frequency AC driver circuits mounted on said frame and connected to drive said plurality of UV lamps, and
- a low-voltage DC supply connected to said set of high-frequency AC driver circuits.

8. The water treatment apparatus defined in claim 7 including a UV reflector mounted on said frame above said UV lamps.

9. The water treatment apparatus defined in claim 7 including a UV transmissive cover mounted on said frame below said UV lamps.

10. The water treatment apparatus defined in claim 7 wherein each of said high-frequency AC driver circuits is encased in a waterproof plastic mass.

11. The water treatment apparatus defined in claim 8 including a UV transmissive cover mounted on said frame below said UV lamps.

12. The water treatment apparatus defined in claim 11 wherein each of said high-frequency AC driver circuits is encased in a waterproof plastic mass.

* * * * *